United States Patent [19]  [11]  4,341,627
Heilhecker  [45]  Jul. 27, 1982

[54] SCREEN SEPARATOR

[75] Inventor: Joe K. Heilhecker, Houston, Tex.

[73] Assignee: The Brandt Company, Houston, Tex.

[21] Appl. No.: 261,144

[22] Filed: May 6, 1981

[51] Int. Cl.³ .............................................. B07B 1/46
[52] U.S. Cl. .................................. 209/409; 209/403; 277/205
[58] Field of Search ............... 209/399, 403, 405, 315, 209/319, 269, 409; 210/498, 499, 389; 277/205; 140/108; 160/378, 379

[56] References Cited

U.S. PATENT DOCUMENTS

| | | | |
|---|---|---|---|
| 2,213,773 | 9/1940 | Symons | 209/403 |
| 2,716,493 | 8/1955 | Hutchison | 209/269 X |
| 3,666,095 | 5/1972 | Krynock et al. | 209/403 X |
| 3,666,277 | 5/1972 | Hubach et al. | 209/403 X |

Primary Examiner—Ralph J. Hill
Attorney, Agent, or Firm—Vaden, Eickenroht, Thompson, Bednar & Jamison

[57] ABSTRACT

An improved screen separator which employs orbital motion for the positive removal of solids from liquids, such as drilling mud. A tensioned screen is mounted horizontally at it peripheral edges between parallel side members of a framework. A cushion rail mounted between the side members carries a resilient screen cushion in tight engagement with the screen. The unique screen cushion has an elongated body with a longitudinal slot receiving the lower edge of the cushion rail. The body has diverging sides which terminate at flared lips at each edge of the concave bottom side of the body. The body produces a downward bow in the screen and the bottom side surface conforms precisely to the the bowed screen. As a result, abrasive solids can not be trapped between the screen cushion and the screen. In addition, the body has diverging sides which divert solids from the screen cushion laterally onto the adjacent screen for separation from the liquid being purified.

10 Claims, 5 Drawing Figures

SCREEN SEPARATOR

BACKGROUND OF THE INVENTION

1. Field of the Invention

This invention relates to the separation of solids from liquids and more particularly it relates to orbital screen separators for removing cuttings and other solids from drilling muds.

2. Description of Prior Art

Various types of screen separators employ a woven or perforated screen in a positive orbital motion for the separation of solids from a liquid with good results. As the screen moves, separated solids are moved to its leading edge for ready discharge. In order to prevent stagnant areas of solids on the screen, it is bowed downwardly in its central portions relative to the edges secured to the oscillating mechanism. Generally, rails are mounted above the screen and extend along the axis of solid movements across the screen. The screen is tensioned at its edges so that it is firmly pressed in a bow-like curve against a resilient cushion carried on the lower portion of each rail. The cushion provides for a resilient buffer between the rail and the screen. Also, the screen is restricted in moving relative to the rail by the cushion. As a result, abrasive solids hopefully will not move between the cushion and the screen. If the screen moves relative to the cushion, entrapped solids cause severe and undesired wearing of the screen. Although the screen is under a tension of several hundred pounds of pull between its edges, a slight movement of the screen relative to the cushion does occur. Thus, entry of solids between the prior art cushion and the screen are a primary function of screen tension.

It has been found that the screen cushion must be uniquely designed so that it will function with the screen movements to keep solids from working their way between the cushion and the screen, within the parameters of screen tension and bowing permitted in conventionally operating screen separators. It is the purpose of this invention to provide such a unique screen cushion that can be employed with conventional screen separators so as to avoid the problems associated with resilient screen cushions that have been employed in conventional screen separators up to the present time.

SUMMARY OF THE INVENTION

In accordance with this invention, there is provided an improved, resilient screen cushion for use in an oscillating separator mechanism having a screen framework mounting a screen at its peripheral edges between parallel side members. The screen is placed into tension between the side members, and at least one cushion rail is fixedly disposed between the parallel side members. The screen bows downwardly beneath the cushion rail and the parallel side members to which the screen is secured. The improvement comprises a unique resilient screen cushion having an elongated body with a longitudinal slot in its topside for receiving the lower edge of the cushion rail. The body has diverging sides extending from the topside to flared lips at each edge on the bottom side of the body. The bottom side has a concave surface between the flared lips before the screen cushion is placed in contact with a tension screen. Then, the bottom side of the body produces a downward bow in the tension screen. As a result, the bottom side provides a surface conforming to the curvature of the bowed screen with substantial compression being exerted by the flared lips against the screen so as to prevent solids from entering and being trapped between the screen cushion and the screen it engages, and to accommodate the screen when vibrating relative to the screen cushion.

DESCRIPTION OF THE DRAWINGS

In these drawings, the embodiments of the present resilient screen cushion have common elements of construction. In regard to these several figures, like elements carry like numerals to simplify description of these various embodiments in describing the present unique screen cushion.

DESCRIPTION OF SPECIFIC EMBODIMENTS

Figure 1:
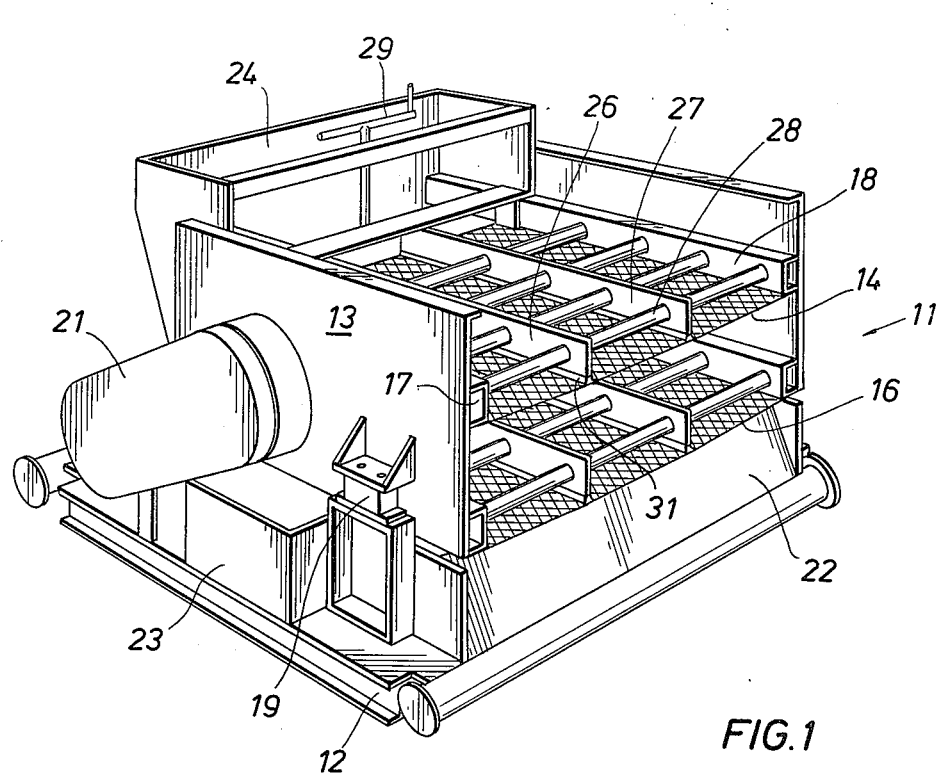
FIG. 1 is an isometric pictorial view of a screen separator provided with the unique spring cushions of the present invention.

Referring to FIG. 1, there is shown a screen separator of the tandom type having superimposed screens which are held in a bowed tension relationship by cushion rails carrying the unique resilient screen cushions of the present invention. More particularly, the separator 11 is mounted upon a suitable base 12 which carries an orbital screen framework 13. The framework 13 is mounted on resilient mounts 19 to the base 12. The screen framework 13 is oscillated or placed into orbital motion by a motor and oscillating mechanism 21. As a result, the framework 13 moves upon the mounts 19 in an orbital or oscillatory motion relative to the base 12. This motion has both vertical and horizontal components which occur in a vertical plane aligned with the sides of the framework 13. The framework 13 carries an upper screen 14 above a lower screen 16, and these screens are positioned substantially horizontal in uniform spaced relationship relative to each other. In as much as both screens are mounted by substantially the same construction in the framework 13, only the screen 14 will be described in detail.

The screen 14 is of a suitable size such as 4 by 5 feet and may have interwoven wires forming mesh openings between 8 and 160 mesh sizes according to the American standard screen sizes. Preferably, the screen 14 is formed of interwoven stainless steel wires. The screen 14 is held at its sides by a side member 17 which is secured to one side of the framework 13 and a laterally movable side member 18 that can be moved towards and away from the other side of the framework 13 by a suitable thread and spring arrangement which is conventional in screen separators employed in removing cuttings or other solids from drilling muds. A plurality of transverse rods 28 extend between the side members 17 and 18 and serve for fixedly mounting one or more cushion rails 26 and 27 to the framework 13. The screen 14 carries a j-hook edged arrangement which can be easily slid upon lips formed in the side members 17 and 18 so that the screen (untensioned) may be readily installed and removed from the framework 13. Also, the rails carry on their lower edges resilient cushions to engage and downwardly bow the screen when it is under tension. The bowing in the screen causes solids to be moved away from the side members and facilitate a readily discharge of the separated solids from the front edges of the screens. The cushion rails each carry a resilient cushion but only the cushion 31 which is mounted upon the rail 26 will be described in detail.

Figure 3:
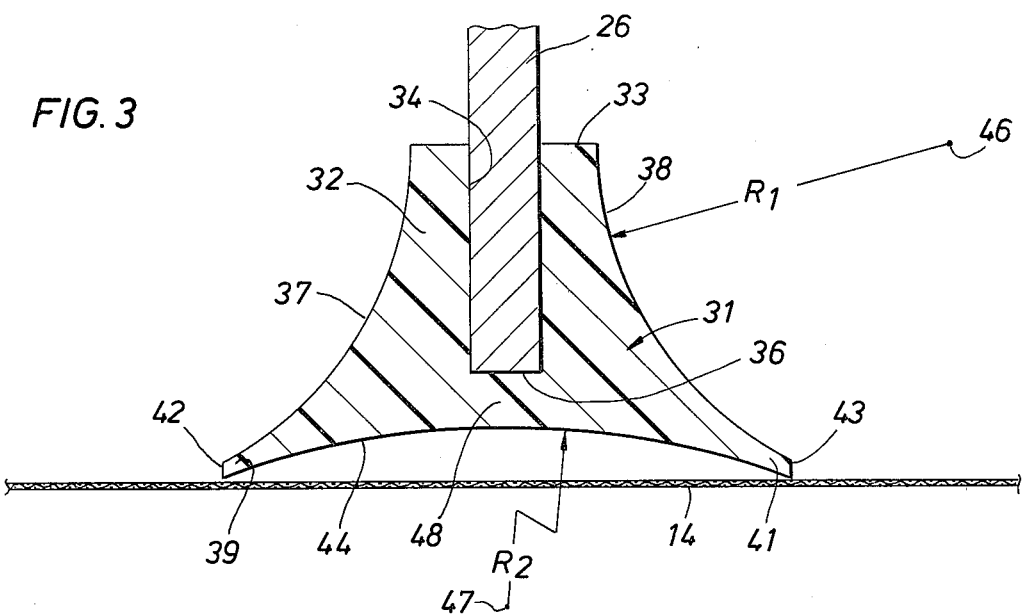
FIG. 3 is a cross sectional view taken through the screen cushion of the present invention prior to its engagement with a tensioned screen.

Referring now to FIG. 3, the mounting of the screen cushion 31 upon the cushion rail 26 is shown. The cushion 31 has an elongated body 32 which in its top side 33 carries a longitudinal rectangular slot 34 adapted to receive the lower edge 36 of the rail 26. The body 32 is preferably symetrical about the upright axis. More particularly, the body 32 has diverging sides 37 and 38 which extend downwardly from the top side 33 to flared lips 39 and 41 at each edge 42 and 43 of the bottom side 44 of the body 32. In addition, the bottom side of the body is formed with a concave surface between the flared lips 39 and 44. Preferably, this concave surface between the lips is also symetrical relative to the upright axis extending through the rail 26.

The screen cushion 31 has the body 32 formed of a resilient material such as natural or synthetic rubber, and various polymeric resilient materials having properties similar to such rubber materials. As a result, the flared lips 39 and 41 upon contacting the screen 14 undergo a slight precompression and form what is similar to a pressure actuated lip seal such as carried upon certain types of mud valves, hydraulic pistons, hydraulic actuators, and automobiles braking systems.

Although the body 32 may have various arrangements of these several surfaces and parts heretofore described, it is preferred that the diverging sides are curvilinear in configuration so that solids flow downwardly from the rail 26 across these sides and laterally across the edges 42 onto the screen adjacent to the cushion 31. Preferably, the diverging sides are curvilinear in configuration as part of a circle arc at a first radius $R_1$ which extend from a locus 46 on a line parallel to the top side 33. The radius $R_1$ should be such that when the bottom side 44 is in full contact with the tension screen 14 the divergent sides cannot be folded into a sufficiently small radius to form a gutter to trap solids so that they would move longitudinally along the cushion 31 and off of the cushion at the edge of the screen thereby bypassing the movement of the solids along the screen 14. Also, the bottom side 44 preferably has a concave surface between the flange lips 39 and 41 which is formed of a circle arc at a second radius $R_2$ having a locus 47 that is spaced from the cushion 31 on the upright axis passing through the rail 26. Good results are obtained when the radius $R_2$ is substantially greater than the radius $R_1$. Preferably, the radius $R_1$ is about one fourth of the radius $R_2$ for improved results by the cushion 31 in fully engaging the tension screen 14 in its bowed condition.

The body 32 is preferably extruded from a synthetic rubber polymer, and good results are obtained from a Buna-N synthetic rubber material. Extrusion of the body 32 appears to produce better results because of the alignment of polymer chains in the cushion 31 as a result of extrusion of the body 32 along its longitudinal axis. Preferably, the body 32 is formed from Buna-N synthetic rubber which has a hardness value of between about 40–85 durometer A scale. However, other equivalent types of polymeric materials may be employed for forming the body 32 and will achieve good results in the present invention.

Figure 4:
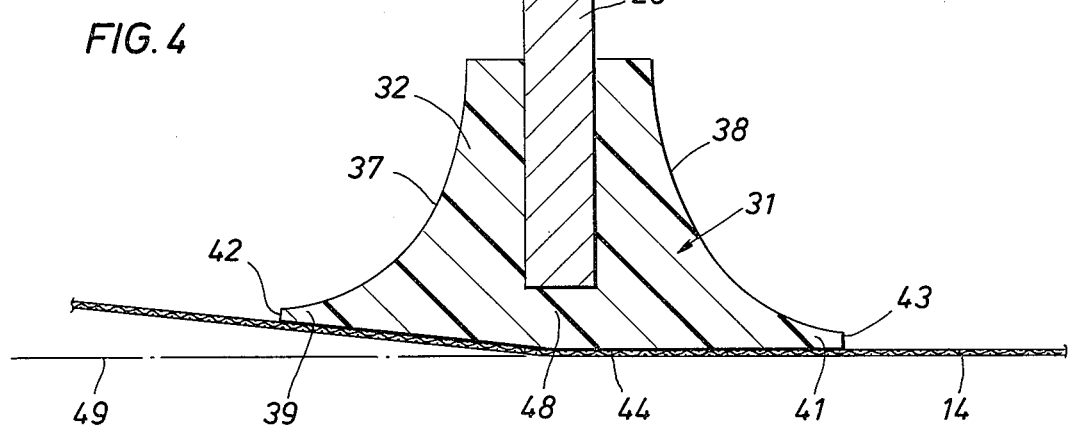
FIG. 4 is a view like FIG. 3 but after the screen cushion contacts a tensioned screen which is in the bowed configuration; and, FIG. 5 illustrates the cushion of FIG. 4 but when subjected to a tension screen that is bowed at equal angles to each side of the cushion rail.

As the screen 14 is tensioned between the side members, the screen is pulled upwardly in a bow relative to the rail 26 and thereby compress the zone 48 in the body 32 that reside between the screen 14 and the lower edge 36 of the rail 26. The result of the compression of the zone 48 by the tension screen 14 is shown in FIG. 4. Since there are several rails in the separator 11, the screen is divided in approximately 3 tensioned portions. Therefore the screen 14 is bowed to a greater curvature toward the side members than between the two adjacent rales 26 and 27. Thus, the flange edge 39 has been moved upwardly producing a greater curvature flexure on the divergent side 37 than the flanged lip 41 at the side 38.

Preferably, the resiliency of the body 32 is such that when the screen 14 is placed under a tension of several hundred pounds between its edges, for example 600 pounds, the lips and the compression zone 48 of the cushion 31 will be compressed approximately 10 to 15 percent in dimension along the upright axis passing through the rail 26. As a result, the bottom side surface 44 now conforms exactly to the curvature of the bowed screen 14. The flared lips 39 and 41 are both under substantial compression due to the bowed screen 14 and move with the screen. As a result of lips moving with the screen, solids cannot enter between the edges 42 and 43 of the cushion 31 and the bottom side 44 which engages the screen 14. Although the screen framework 13 can move positively in an orbital motion of several inches and undergoes severe accelerations and decelerations in its oscillations, the screen 14 remains in firm engagement with the bottom side 44 of the cushion 31.

Figure 5:
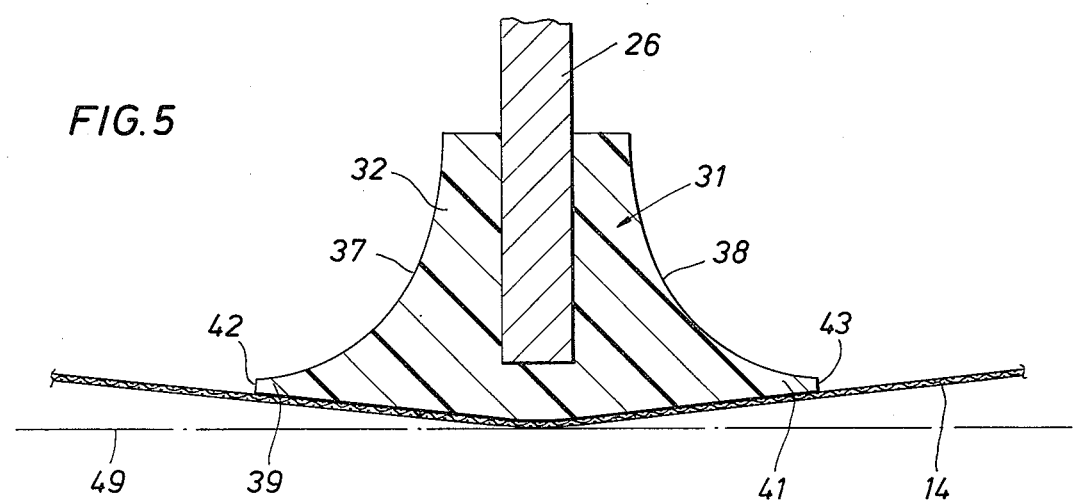

Generally, each of the cushion rails is so arranged as to produce a bowing of the screen immediately beneath them irrespective of the number of rails carried upon the screen framework 13. Thus, the arrangement in FIG. 4 illustrates the use of the unique cushion 31 where the screen is divided into a odd number of portions. In many instances there will be a cushion rail placed centrally between the sides of the screen frame 13 and such an arrangement is shown in FIG. 5. There, the bowed screen 14 is deflected equally relative to a horizontal axis 49 by the cushion 31. Therefore the flared lips 39 and 41 have been deflected upwardly in equal magnitudes. However, the functions of the cushion 31 remain substantially the same as has been described in FIG. 4. Thus, the cushion 31 due to its novel construction permits the use in conjunction with a tension screen that results in bowing beneath the cushion 31 in equal or different magnitudes relative to the flared lips 39 and 41. The cushion 31 by its lips provides equally in preventing solids from slipping past its edges 42 and 43 to accumulate distructively between the bottom surface 44 and the contacted screen 14.

Figure 2:
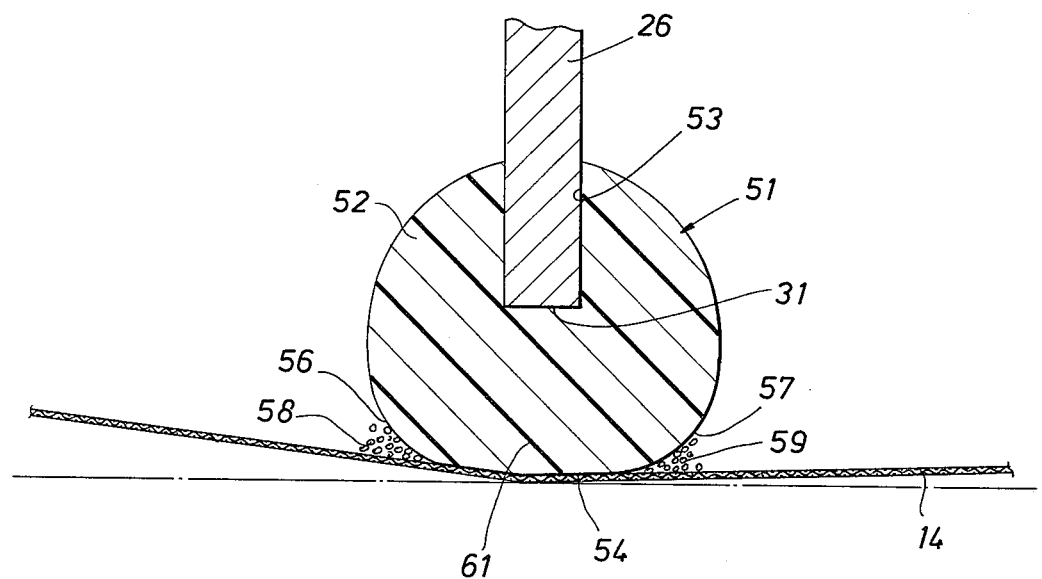
FIG. 2 is a cross section taken through a cushion rail and screen carrying a prior art type of resilient screen cushion.

The great advantages of the present unique screen cushion 31 can easily be appreciated by reference to FIG. 2 wherein an identical arrangement such as shown in FIG. 4 is illustrated relative to a prior art resilient cushion. The prior art cushion 51 is an elongated round extruded resilient material, which may be the same Buna-N synthetic rubber as used in the present invention. The body 52 of the cushion 51 carries a longitudinal slot 53 in which is received the lower edge 36 of the rail 26. The round configuration of the body 52 is distorted into a pear like shape whenever the screen 14 is placed under tension and compresses the bottom surface 54 upwardly toward the edge 36 of the rail 26. However, it is to be noted that because of the convergent sides 56 and 57 of the body 52 adjacent the screen 14 that large masses of solids 58 and 59 may accumulate beneath the major portion of the body 52. The screen oscillation forces which produce varying compression within the compression zone 61 of the body 52 and solids by a wedging action will slowly work between the bottom surface 54 and the engaged portions of the tension screen 14. These solids cause severe wearing of these portions of the screen 14, and eventually, its ultimate failure. The oscillating forces allow the screen to slightly move away from the surface 54 which further enhance the traffic of the solids between the bottom side 54 and the adjacent screen 14. As a result, the injury and ultimate distruction of the screen 14 by the prior art cushion 51 may be readily appreciated when considered relative to the cushion 31 of the present invention.

In direct comparison, the divergent sides 37 and 38 of the present cushion 31 divert solids away from the eges 42 and 43. The flared lips 39 and 41 maintain compression adjacent these edges irrespective of the variation of the compressive loading of the compression zone 48 by the vibrations in screen 14. In direct comparison, the prior art cushion 51 because of the converging sides 56 and 57 direct solids into the region between the screen 14 and the bottom side 54. In addition, the variations of compression upon the compression zone 61 enhance the wedging movement of these solids between the bottom side 54 and the screen 14 when using the prior art screen cushion 51. As a result, a direct comparison shows many advantages of the resilient screen cushion 31 formed in accordance with the present invention.

From the foregoing, it will be apparent that there has been provided a unique, resilient screen cushion that is readily employed upon conventional screen separators which are subjected to positive orbital motion for separating solids, such as cuttings, from a liquid, such as drilling mud. It will be appreciated that certain changes and alterations in the present improved screen separator and unique resilient screen cushion may be made without departing from the spirit of this invention. These changes are contemplated by and are within the scope of the appended claims which define the invention. Additionally, the present description is intended to be taken as an illustration of these inventions.

What is claimed is:

1. In an oscillating separator mechanism having a screen framework mounting a screen at its peripheral edges between parallel side members adapted to place the screen into tension, at least one cushion rail fixedly disposed between the parallel side members, and a resilient screen cushion carried by the cushion rail in tight engagement with the tensioned screen, the improvement comprising;
   (a) said resilient screen cushion having an elongated body with a longitudinal slot in its topside for receiving the lower edge of the cushion rail,
   (b) said body having diverging sides extending from the topside adjacent said slot to flared lips at each edge on the bottom side of said body,
   (c) said bottom side of said body having a concave surface between said flared lips before said screen cushion is in contact with said screen, and
   (d) said bottom side of said body producing a downward bow in said screen after being placed under tension in the screen framework and said bottom side providing a surface conforming to the curvature of the bowed screen with substantial compression being extended by said flared lips against said screen to prevent particulate matter from entering and being trapped between said screen cushion and the tensioned screen it engages.

2. The screen cushion of claim 1 wherein said body is extruded from Buna-N synthetic rubber.

3. The screen cushion of claim 1 wherein said body beneath the cushion rail is compressed between about 10 and 15 percent by the tensioned screen whereby said bottom side produces the surface conforming to the curvature of the bowed screen.

4. The screen cushion of claim 1 wherein said body is of sufficient resiliency that loading and vibrations induced from oscillations of the screen framework do not separate said bottom side of said body from the tensioned screen.

5. The screen cushion of claim 1 wherein said diverging sides of said body are curvilinear in configuration whereby particulate material flow downwardly from the cushion rail and are directed laterally away from said screen cushion onto the screen.

6. The screen cushion of claim 5 wherein the curvature of said curvilinear diverging sides is sufficiently small that a fold or gutter to trap particulate material cannot be created when said bottom side of said body is in full contact with the tensioned screen.

7. The screen cushion of claim 1 wherein said diverging sides of said body are symetrical about an upright axis through the cushion rail and curvilinear in configuration of a circle arc at a first radius and said bottom side of said body having between said flange lips a concave surface formed of circle arc at a second radius having a locus on the upright axis through the cushion rail.

8. The screen cushion of claim 1 wherein said first radius is about one-fourth of said second radius.

9. The screen cushion of claim 1 wherein said body is extruded from Buna-N synthetic rubber having a hardness of between about 40-85 Durometer A scale and wherein said body beneath the cushion rail is compressed between about 10 and 15 percent by the tensioned screen whereby said bottom side produces the surface configuration conforming to the curvature of the bowed screen and loading and vibrations induced from oscillations of the screen framework do not separate said bottom side of said body from the tensioned screen, and said diverging sides of said body are symetrical about an upright axis through the cushion rail and curvilinear in configuration of a circle arc at a first radius and said body having between said flange lips a concave surface formed of a circle arc at a second radius having a locus on the upright axis through the cushion rail, and said first radius is about one-fourth of said second radius.

10. As a subcombination, a screen cushion for use in a oscillating solids separating mechanism comprising:
   (a) an elongated body extruded from Buna-N synthetic rubber having a hardness of between about 40-85 durometer A scale,
   (b) said body having a symetrical cross section on the upright and transverse axes,
   (c) said body provided in its flat topside with a longitudinal slot of rectangular configuration which extends along the upright axis and terminates in spaced relationship to the bottom side of said body forming a compression zone, (d) said body having diverging sides extending from the topside to flared lips at each edge of said bottom side, and said diverging sides being curvilinear in configuration at a circle arc at a first radius, (e) said bottom side between said flange lips being concave with a circular surface formed of a circle arc at a second radius having a locus on the upright axis, (f) said first radius is about one-fourth of said second radius, and (g) said compression zone being substantially greater in dimension than the dimension between said bottom side surface and said flared lips, both dimensions being taken along the upright axis.

* * * * *